No. 737,884.

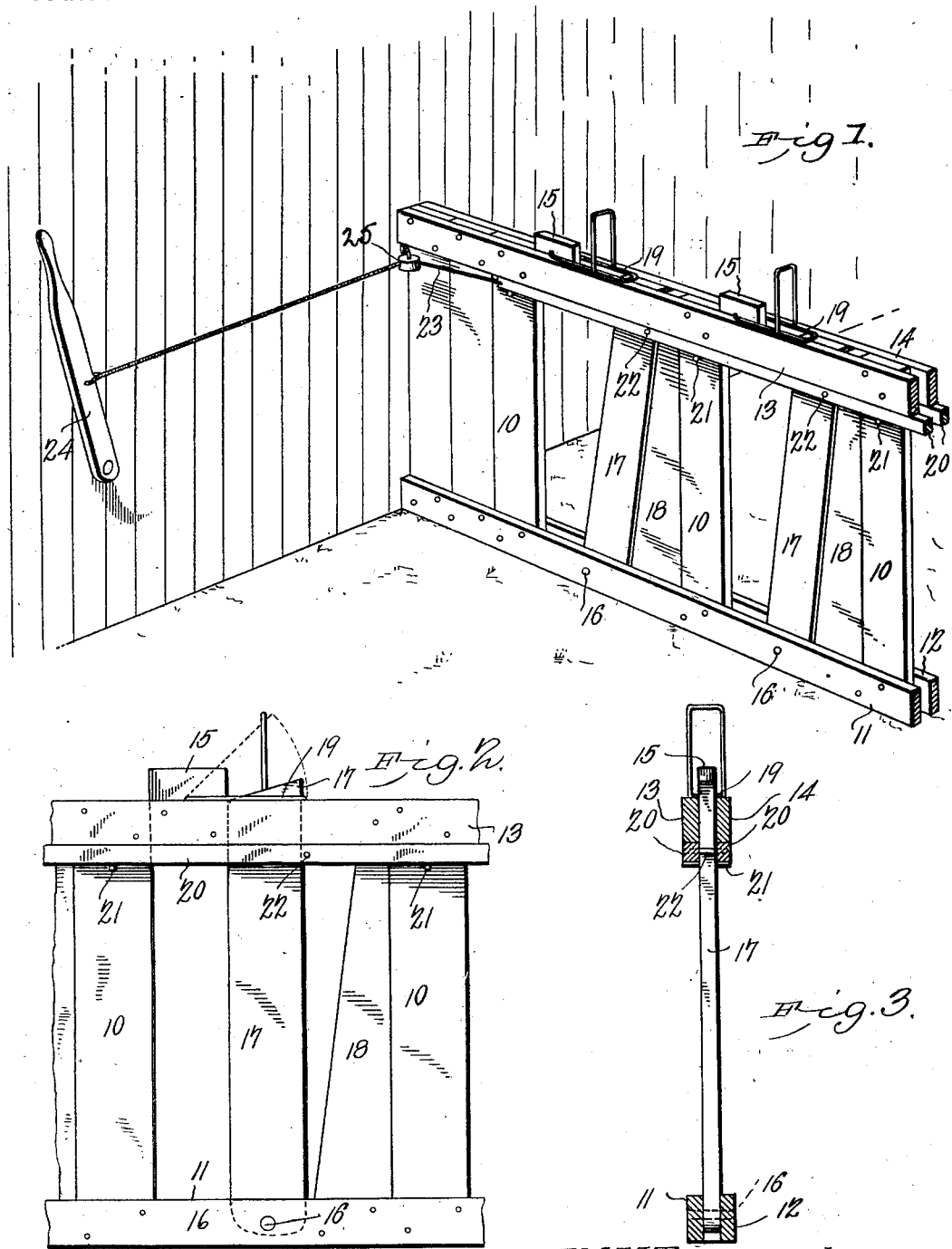

Patented September 1, 1903.

UNITED STATES PATENT OFFICE.

JOHN H. M. THOMPSON, OF CENTER JUNCTION, IOWA.

CATTLE-STANCHION.

SPECIFICATION forming part of Letters Patent No. 737,884, dated September 1, 1903.

Application filed February 14, 1903. Serial No. 143,429. (No model.)

*To all whom it may concern:*

Be it known that I, JOHN H. M. THOMPSON, a citizen of the United States, residing at Center Junction, in the county of Jones and State of Iowa, have invented a new and useful Cattle-Stanchion, of which the following is a specification.

This invention relates to improvements in cattle-stanchions; and the object of the invention is to improve and simplify the construction of devices of this class and to provide improved means whereby any stanchion may be independently released or closed.

Other novel features of the invention will be disclosed in the following description and the novel features will be particularly specified in the claims following.

In the drawings illustrative of the invention, in which corresponding parts are denoted by like denoting characters, Figure 1 is a perspective view of the device applied. Fig. 2 is a side view, and Fig. 3 is a cross-sectional view, enlarged, illustrating the construction more fully.

The device may be erected at any desired point, but preferably in the stable where the cattle are to be fed and cows to be milked, and consists of vertical spaced stanchions 10 supported at their lower ends by foot-plates 11 12 and at their upper ends by the head-plates 13 14.

Supported between the head-plates 13 14, next to the stanchions 10, are stop-blocks 15, the stop-blocks extended above the head-plates and corresponding in width to the space it is desired to leave for the necks of the animals.

Movably connected between the foot-plates 11 12, as by pivots 16, are movable stanchions 17, the upper ends of the latter extending between the head-plates 13 14 with their upper ends inclined relative to their sides, as shown.

Between the inoperative sides of the movable stanchions 17 and the adjacent edges of the stationary stanchions 10 are angular filling-plates 18, against which the movable stanchions fall when open, as shown in Fig. 1, so that the cattle are compelled to insert their heads only between the stanchions at the proper places.

Pivotally connected by one end in the projecting ends of the stop-blocks 15 are endless links 19, adapted to inclasp the upper ends of the movable stanchion 19 when closed and serve as a locking means thereto. When the movable stanchions are open, as in Fig. 1, the locking-links rest by their free ends upon their inclined upper ends and then when the movable stanchions are moved into their closed position the lock-links will be automatically engaged with the stanchions, as will be obvious.

Supported beneath the lower edge of the head-plate 13 and in slidable contact therewith is a rod or bar 20, being supported in position as by spaced pins 21, extending from the stationary stanchions 10, as shown.

Extending from the rod or bar 20 on the inoperative side of each of the movable stanchions 10 is a pin 22, and connected to the end of the rod, as by a rope or cable 23, is an operating-lever 24, as shown. By this simple arrangement it will be obvious that when the lever is operated the rod or bar 20 will be moved longitudinally of the head-plates and cause the pins 22 to throw all the movable stanchions into their vertical positions, in which they will be automatically locked by the lock-links 19. If at any time it is desired to release one of the animals, it is only necessary to raise the link-bar 19 and throw back the movable stanchion which holds that particular animal. This reverse action returns the rod or bar 20 to its former position, but will not release the remaining movable stanchions, as they are still held by their respective locking-links. Then, again, if it is desired to secure one or more of the animals and leave the remaining ones free it can be easily done by operating the desired stanchion by hand in the usual manner, as the presence of the rod or bar 20 and its operating-pins 22 does not interfere with the complete independence of the movable stanchions either in opening or closing, while at the same time they can all be closed in concert, as before noted.

The lever 24 may be located at any desired point and the cable 23 conducted over a guide-pulley 25 in any desired direction, as will be obvious.

While one of the rods or bars 20 and its spaced pins 22 will be sufficient to produce the desired results, preferably two of the rods or bars will be employed, as shown in Fig. 3, upon opposite sides of the head-plates 13 14 and connected by the spaced pins 22, as this construction insures a more complete and uniform action and obviates side strains.

It will be noted that the rods or bars 20 travel beneath the lower edges of the head-plates 13 14 and in constant contact therewith and cross over the apertures in which the necks of the animals are secured, and by having the rods or bars thus in constant contact with the head-plates the rods will not be displaced or broken by the necks of the animals coming in contact therewith, as the rods are protected by the head-plates. This is an important feature of the invention and adds materially to the efficiency of the device.

Having thus described the invention, what I claim is—

1. In a cattle-stall spaced stationary stanchions connected by a longitudinal head-plate, movable stanchions disposed between said stationary stanchions, a rod slidably supported beneath said head-plate and in contact therewith and provided with spaced laterally-projecting pins each adapted to contact with one of said movable stanchions on the inoperative side thereof, means for moving said rod transversely of said stanchions whereby said movable stanchions may be moved in one direction, and locking devices for said movable stanchions provided upon the upper surface of said head-plate, substantially as described.

2. In a cattle-stall, spaced stationary stanchions connected by longitudinal head-plates, movable stanchions disposed between said stationary stanchions, rods slidably supported beneath said head-plates and in contact therewith upon opposite sides of said stanchions, pins connecting said rods and adapted to engage said movable stanchions on the inoperative sides thereof, means for moving said rods transversely of said stanchions, and links pivotally supported above said head-plates and adapted to engage with the upper ends of said movable stanchions and lock them in closed position.

In testimony that I claim the foregoing as my own I have hereto affixed my signature in the presence of two witnesses.

JOHN H. M. THOMPSON.

Witnesses:
H. A. ATWOOD,
W. L. ORERLEY.